(12) United States Patent
Yamagiwa

(10) Patent No.: US 6,866,735 B2
(45) Date of Patent: Mar. 15, 2005

(54) METHOD OF MANUFACTURING A TIRE TUBE

(75) Inventor: Toshio Yamagiwa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/207,956

(22) Filed: Jul. 31, 2002

(65) Prior Publication Data

US 2002/0189745 A1 Dec. 19, 2002

Related U.S. Application Data

(62) Division of application No. 09/261,739, filed on Mar. 3, 1999, now Pat. No. 6,451,162.

(30) Foreign Application Priority Data

Mar. 4, 1998 (JP) .......................................... 10-069470

(51) Int. Cl.⁷ ............................................ B29D 23/24
(52) U.S. Cl. ..................... 156/115; 156/119; 264/209.1
(58) Field of Search ................................. 152/506, 507, 152/502–505, 511, 512; 156/115, 119, 64; 264/209.1, 326

(56) References Cited

U.S. PATENT DOCUMENTS

| | | |
|---|---|---|
| 574,577 A | 1/1897 | Royle |
| 1,689,907 A | 10/1928 | Allen |
| 1,797,183 A | 3/1931 | Wetmore et al. |
| 2,566,384 A * | 9/1951 | Tilton, Jr. ................... 152/504 |
| 2,756,801 A | 7/1956 | Iknayan et al. |
| 2,782,829 A | 2/1957 | Peterson et al. |
| 3,903,947 A * | 9/1975 | Emerson ..................... 152/504 |
| 4,090,546 A | 5/1978 | Honda et al. |
| 4,895,610 A | 1/1990 | Egan |
| 4,966,213 A * | 10/1990 | Kawaguchi et al. ........ 152/504 |

FOREIGN PATENT DOCUMENTS

| | | |
|---|---|---|
| EP | 795428 | 9/1997 |
| EP | 0 818 302 A | 1/1998 |
| GB | 708 800 A | 5/1954 |
| GB | 748 117 A | 4/1956 |

OTHER PUBLICATIONS

Patent Abstract of Japan, vol. 005, No. 087 (M–072), Jun. 6, 1981, Sumitomo Rubber IND LTD.

* cited by examiner

Primary Examiner—Geoffrey L. Knable
(74) Attorney, Agent, or Firm—Birch, Stewart, Kolasch & Birch, LLP

(57) ABSTRACT

To provide a tire tube having excellent sealing performance and durability. An inside of a tire includes a peripheral wall having an approximately circular cross-section which is partitioned by a partition wall into an outer peripheral side sealant chamber and an inner peripheral side air chamber. The sealant chamber is filled with a sealant having a thickness in the diameter direction in a range of 0.5 to 1.5 mm.

11 Claims, 4 Drawing Sheets

METHOD OF MANUFACTURING A TIRE TUBE

This application is a divisional of application Ser. No. 09/261,739, filed on Mar. 3, 1999, now U.S. Pat. No. 6,451,162, the entire contents of which are hereby incorporated by reference and for which priority is claimed under 35 U.S.C. § 120; and this application claims priority of Application No. 10-069470 filed in Japan on Mar. 4, 1998 under 35 U.S.C. § 119.

BACKGROUND OF THE INVENTION

1. Field of the Invention

The present invention relates to a tire tube and an apparatus for manufacturing the tire tube, and particularly to a tire tube including an air chamber filled with air and a sealant chamber filled with a sealant and an apparatus for manufacturing the tire tube.

2. Description of Related Art

FIG. 1 is a transverse sectional view of a wheel mounted with a tube containing tire including a sealant chamber; FIG. 5 is a flow chart showing steps of manufacturing a tube; and FIG. 6 is a partial perspective view of an extrusion-molding machine for extrusion-molding a tube material.

As shown in FIG. 1, a rim R of a motorcycle wheel is connected to a hub (not shown) via wire spokes (not shown). A tube containing tire T including a tire 1 and a tube 2 contained in the tire 1 is mounted on the rim R. The tube 2 includes a peripheral wall 4 and a partition wall 5 for partitioning the inside surrounded by the peripheral wall 4 into two parts. The peripheral wall 4 is composed of an air chamber peripheral wall 41 positioned radially inward of the tube 2, and a sealant chamber peripheral wall 40 positioned radially outward of the tube 2. The partition wall 5 is molded integrally with the peripheral wall 4.

An air chamber 3, which is surrounded by the air chamber peripheral wall 41 and the partition wall 5 in an approximately circular shape in cross-section, is filled with air. A sealant chamber 7, which is surrounded by the sealant chamber peripheral wall 40 and the partition wall 5 in an approximately arcuate shape, is filled with a known liquid sealant 8. The air chamber peripheral wall 41 has an air valve 6 for filling the air chamber 3 with air.

As shown in FIG. 5, a process of manufacturing the tube 2 includes a material kneading step, a tube material extrusion-molding step, a cutting step, an air valve mounting step, a joining step, and the like.

A material composed of a crude rubber kneaded during the material kneading step is extrusion-molded into a tube material 2' by an extrusion-molding machine during the tube material extrusion-molding step. The tube material 2' is cut into a specific length during the cutting step; an air valve 6 is mounted at a suitable position on the air chamber peripheral wall 41 during the air valve mounting step; and both ends of the tube material 2' are joined to each other during the joining step. After that, the material 2' is subjected to a vulcanizing step and a sealant filling step to obtain a finished tire tube.

As shown in FIG. 6, a nozzle 12 of an extrusion-molding machine 11 has surface lubricant delivery ports 14a and 14b and surface lubricant suction ports 13a and 13b for supplying and discharging a surface lubricant such as talc into the air chamber 3 and the sealant chamber 7, respectively.

The general sealing performance of a tire is improved by increasing the charged amount of a sealant 8 into the sealant chamber 7, thereby increasing the thickness "t" of the sealant 8; however, when the charged amount of the sealant 8 is increased, the weight of the tire tube 2 is increased to thereby degrade the durability of the tire tube 2 at the contact surface with a tire 1.

In this way, since the durability of the tire tube 2 is incompatible with the sealing performance of the tire tube 2, the thickness "t" in the diameter direction of the sealant 8 in the sealant chamber 7 is required to be specified when considering the sealing performance and durability. According to the related art; however, the relationship between the thickness "t" of the sealant 8 in the sealant chamber 7 and the sealing performance/durability has failed to be examined. Therefore, in the tires of the related art, the thickness of the sealant 8 has not been suitably determined. Therefore, it is difficult to make the sealing performance compatible with the durability of the tire.

In the above described related art extrusion-molding machine 11, while talc is delivered in regions forming the air chamber 3 and the sealant chamber 7 from the different surface lubricant delivery ports 14a and 14b respectively, delivery means such as a pump for imparting a delivery pressure is common to the surface lubricant delivery ports 14a and 14b. Accordingly, if a delivery load at one of the surface lubricant delivery ports becomes larger than that at the other surface lubricant delivery port due to some external cause, the delivery force applied by the pump is concentrated on the other surface lubricant delivery port side. As a result, while the surface lubricant in an excessively larger amount is delivered from the latter surface lubricant delivery port with the small delivery load, the amount of the surface lubricant delivered from the former surface lubricant delivery port with the large delivery load becomes insufficient because a specific deliver pressure is not applied to the delivery port.

As shown in FIG. 6, for example, when extrusion-molding is performed when the delivery port 14a is located on the upper side and the delivery port 14b is located on the lower side, a delivery load at the upper delivery port 14a is larger than that at the lower delivery port 14b due to gravity applied to the tube. As a result, while the surface lubricant is delivered in a large amount from the lower delivery port 14b, the surface lubricant is not delivered in a sufficient amount from the upper delivery port 14a.

SUMMARY OF THE INVENTION

A first object of the present invention is to provide a tire tube having increased sealing performance and durability. A second object of the present invention is to provide a tire tube manufacturing apparatus capable of improving the manufacturing yield and durability of a tire tube by preventing adhesive bonding between a peripheral wall and a partition wall of the tube during a vulcanizing step and the like.

To achieve the above objects, the present invention provides the following:

A tire tube including a sealant chamber filled with a sealant on an outer peripheral side thereof, wherein the thickness, in the diameter direction, of the sealant charged in the sealant chamber is in a range of 0.5 to 1.5 mm.

A tire tube manufacturing apparatus for extrusion-molding a tire tube material in which the inside of a peripheral wall having an approximately circular cross-section is partitioned by a partition wall into an outer peripheral side sealant chamber and an inner peripheral side air chamber, wherein the apparatus includes a nozzle plane having a peripheral wall forming gap through which a peripheral wall portion of the tire tube material is extruded, and a partition wall forming gap through which a partition wall portion of the tire tube material is extruded; a first surface lubricant delivery port opened in the nozzle plane at an area partitioned by one side of the partition wall forming gap and the peripheral wall forming gap; a second surface lubricant delivery port opened in the nozzle plane at an area partitioned by the other side of the partition wall forming gap and the peripheral wall forming gap; first delivering means for pressingly supplying a surface lubricant into the first surface lubricant delivery port; and second delivering means for pressingly supplying the surface lubricant into the second surface lubricant delivery port.

With the configuration (1) above, even though incompatible with each other in terms of physical properties, the durability and sealing performance of a tube with the thickness "t" in the diameter direction of the sealant taken as a parameter can be substantially compatible with each other as a matter of practicality.

With the configuration (2) above, since the delivery means for generating a delivery pressure is provided for each of the surface lubricant delivery ports, even if a delivery load at the first surface lubricant delivery port is increased, the delivery pressure applied by the first delivery means does not escape from the second surface lubricant delivery port. Accordingly, a specific delivery pressure can be applied to the first surface lubricant delivery port all the time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, the present invention will be described in detail with reference to the drawings. The present inventor has discovered a new technical problem in a tube having a sealant chamber on a peripheral portion thereof. If the charged amount of sealant into the sealant chamber is increased to increase the thickness of the sealant in the diameter direction, the sealing performance is improved; however, since the weight of the sealant chamber is increased, the durability of the tire tube 2 at the contact surface with the tire 1 is degraded. On the basis of this knowledge, the present inventor has examined a relationship between the thickness of the sealant in the sealant chamber and the sealing performance/durability.

Figure 1:
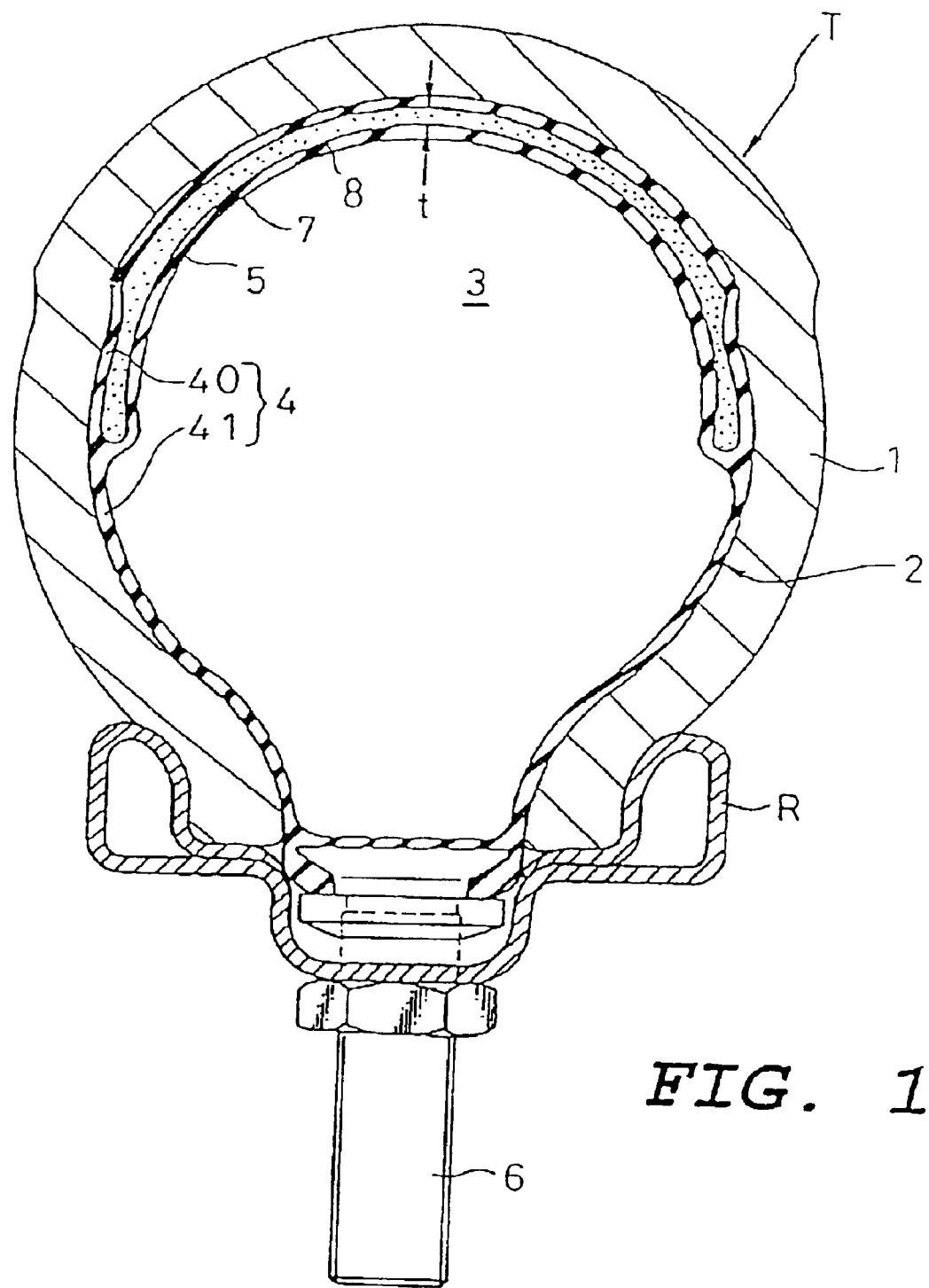
FIG. 1 is a transverse sectional view of a wheel mounted with a tube containing tire including a sealant chamber.
Figure 2:
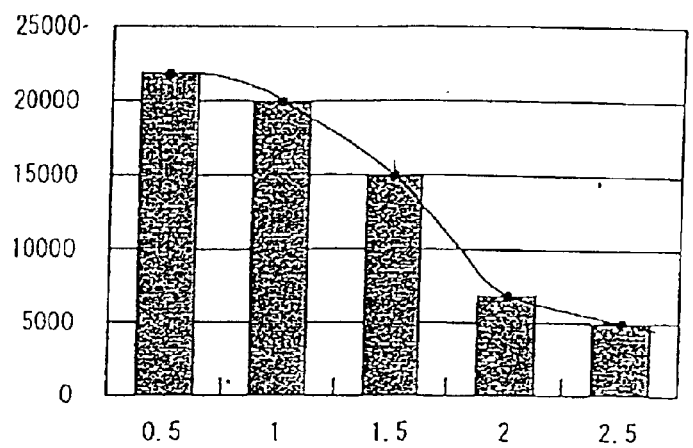
FIG. 2 is a graph showing a relationship between the durability and the thickness of sealant.

FIG. 2 is a graph showing a relationship between the durability (ordinate) of a tube and the thickness (abscissa) of a sealant. A runnable distance was taken as the scale of the durability. The runnable distance was measured with the thickness of the sealant changed by 0.5 mm for each measurement. The experimental results show that the runnable distance becomes larger as the thickness of the sealant becomes thin.

For a motorcycle, the durability of a tire itself is about 10,000 km. Since tube exchange is generally performed simultaneously with tire exchange, the durability of a tube may be set at about 10,000 km as a matter of practicality. Even when considering differences between tube products, the durability of a tube may be set at about 15,000 km. From the experimental results shown in FIG. 2, it is revealed that a durability equal to or more than 10,000 km can be ensured by setting the thickness of the sealant at a value equal to or less than about 1.8 mm. A durability equal to or more than 15,000 km can be ensured by setting the thickness of the sealant at a value equal to or less than 1.5 mm.

Figure 3:
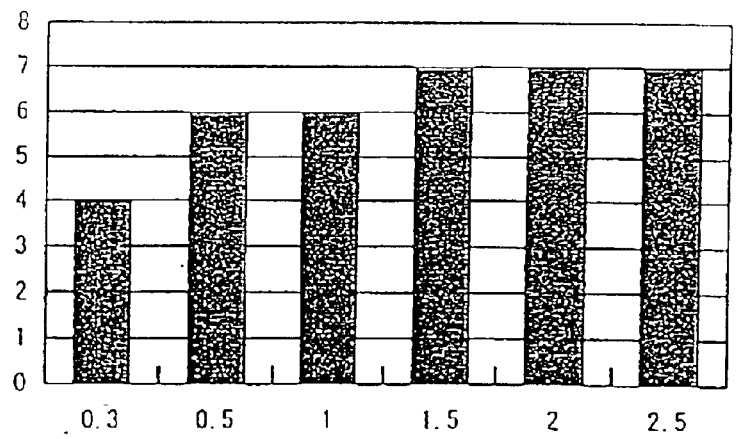
FIG. 3 is a graph showing a relationship between the sealing performance and the thickness of the sealant.

FIG. 3 is a graph showing a relationship between the sealing performance of a tube (ordinate) and the thickness of a sealant (abscissa). The diameter of a hole allowed to be blocked with the sealant was taken as the scale of the sealing performance. The diameter of a hole allowed to be blocked with the sealant was measured with the thickness of the sealant changed by 0.5 mm for each measurement. The experimental results show that the sealing performance becomes higher as the thickness of the sealant becomes larger.

Incidentally, puncture of a tire may be generally due to the fact that a sharpened body such a nail penetrates the tire to perforate the tube. As a result of examination made by the present inventors, it became apparent that the diameter of a sharpened body causing puncture of a tire is substantially in a range of about 2 to 3 mm, and the diameter of a hole opened in the tube by such a sharpened body is about 6 mm. On the basis of the experimental results shown in FIG. 3, it is revealed that the hole having a diameter of 6 mm can be blocked by setting the thickness of the sealant at a value equal to or more than 0.5 mm.

In this way, according to this embodiment, the optical range of the thickness of the sealant was examined in consideration of both the durability and sealing performance of a tire tube. It became apparent that the durability becomes higher as the thickness of the sealant becomes thinner. Furthermore, even if the thickness of the sealant is increased to 1.5 mm, a sufficient durability of the tire tube can be substantially ensured.

Also, it became apparent that the sealing performance becomes higher as the thickness of the sealant becomes larger. Furthermore, even if the thickness of the sealant is decreased to 0.5 mm, a sufficient sealing performance can be substantially ensured.

From the above experiments and the examined results, in this embodiment, the most advantageous thickness of the sealant is in a range of 0.5 mm to 1.5 mm, since the durability and the sealing performance are both sufficient.

As described above, in this embodiment, the thickness in the diameter direction of the sealant is specified at a value in a range of 0.5 mm to 1.5 mm from the viewpoint of the durability and sealing performance actually required for a tire tube. Therefore, the durability and sealing performance, which are incompatible with each other in terms of physical properties, can be made substantially compatible with each other as a matter of practicality.

Figure 4:
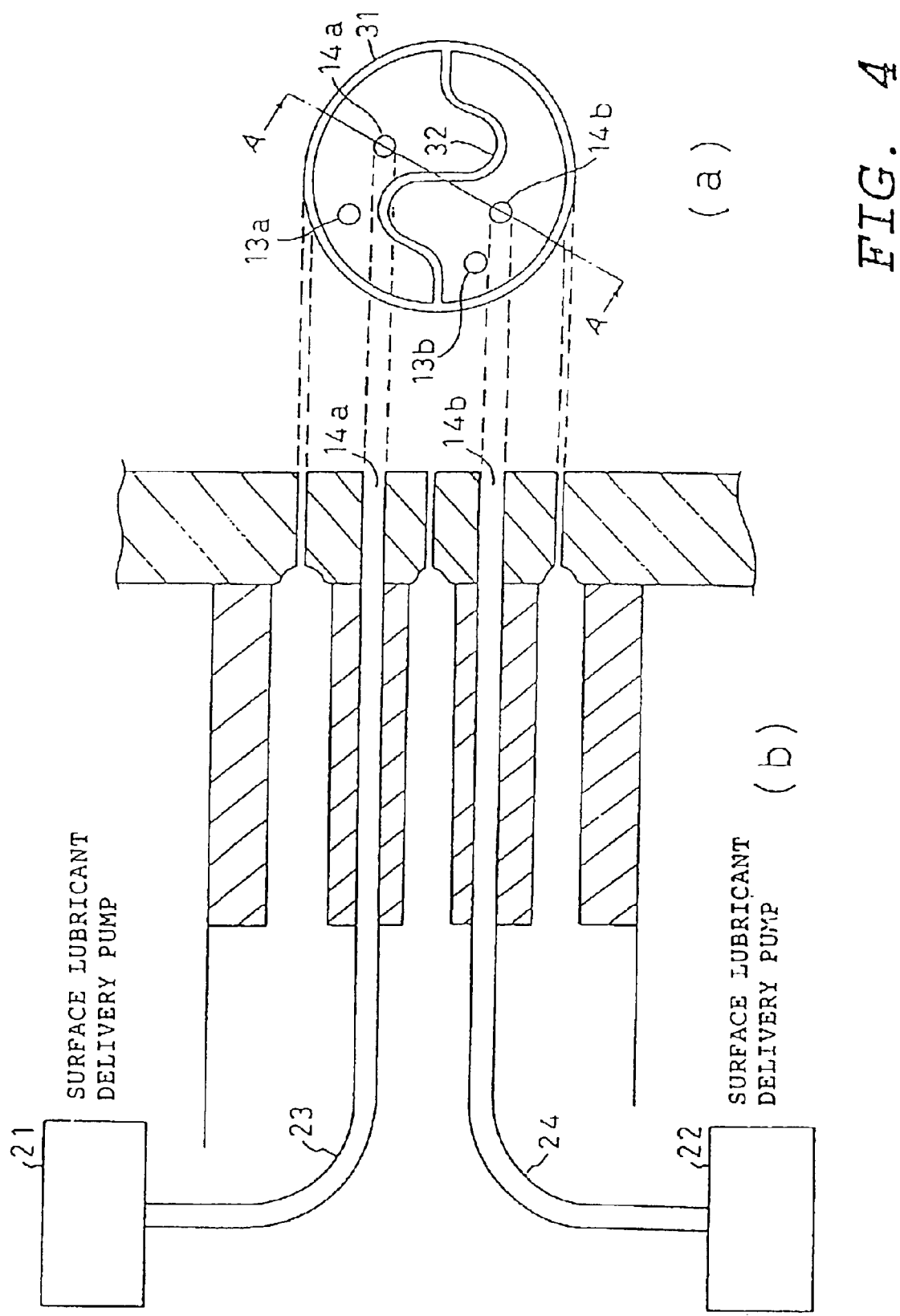
FIGS. 4(a) and 4(b) are sectional view of an extrusion-molding machine of the present invention and a front view of a nozzle of the machine, respectively.
Figure 5:
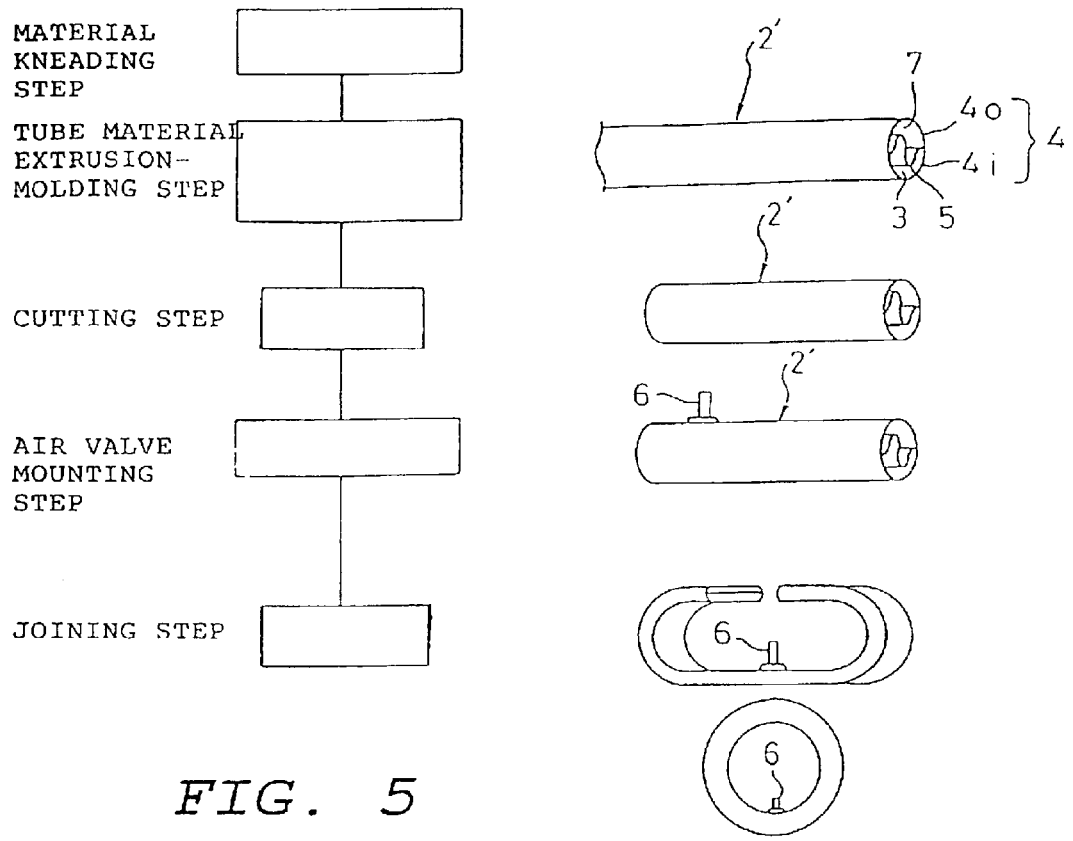
FIG. 5 is a flow chart showing steps of manufacturing a tube.
Figure 6:
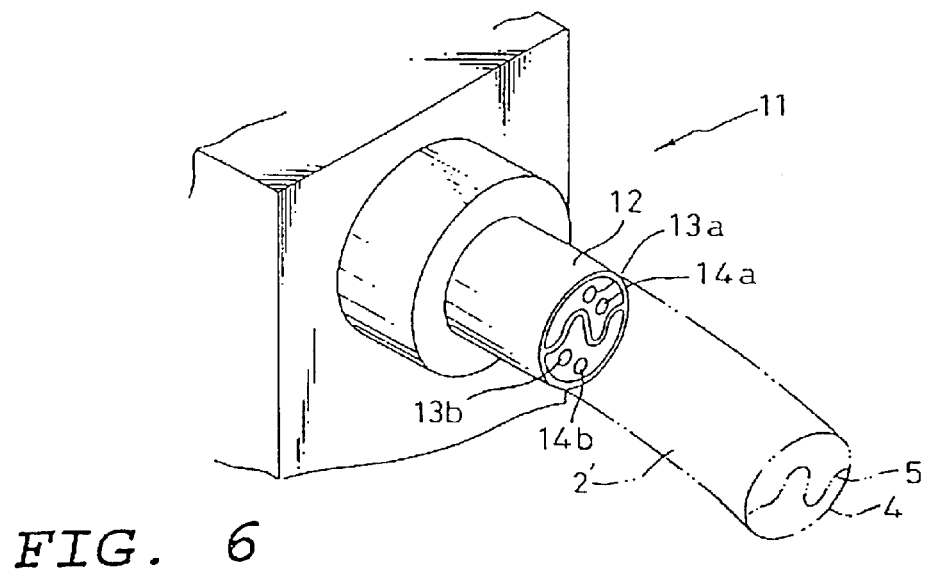
FIG. 6 is a partial perspective view of an extrusion-molding machine.

FIGS. 4(*a*) and 4(*b*) are views showing the configuration of a tube extrusion-molding machine according to a second embodiment of the present invention, wherein FIG. 4(*a*) is a front view of a nozzle plane through which a tube material is extruded, and FIG. 4(*b*) is a sectional view taken on line I—I of FIG. 4(*a*).

The nozzle plane has a peripheral wall forming gap 31 through which a peripheral wall portion of a tube material is extruded and a partition wall forming gap 32 through which a partition wall portion of the tube material is extruded. The nozzle plane also has surface lubricant delivery ports 14*a* and 14*b* and surface lubricant suction ports 13*a* and 13*b* for supplying and discharging a surface lubricant such as talc into an air chamber and a sealant chamber, respectively. The surface lubricant delivery ports 14*a* and 14*b* are, as shown in FIG. 4(*b*), connected to surface lubricant delivery pumps 21 and 22 via pipe lines 23 and 24, respectively.

In this way, according to this embodiment, the surface lubricant delivery pumps 21 and 22 are talc supplying means which are connected to the surface lubricant delivery ports 14*a* and 14*b*, respectively. Accordingly, if a delivery load, such as a resistance of the pipe line, at one surface lubricant delivery port is increased, a supply pressure corresponding to the increased delivery load does not escape from the other surface lubricant delivery port. As a result, a specific supply pressure is always ensured at each surface lubricant delivery port irrespective of the delivery load, to thereby prevent an extreme reduction in the delivered amount.

The supply pressures for supplying the surface lubricant, which are applied by the surface lubricant delivery pumps 21 and 22, are not necessarily equal to each other. For example, if it is previously estimated that a delivery load on the delivery port 14*a* side is larger than that on the delivery port 14*b* side, the supply pressure applied by the surface lubricant delivery pump 21 may be set at a value slightly higher than that applied by the surface lubricant delivery pump 22. This results in the surface lubricant being evenly delivered from each of the delivery ports 14*a* and 14*b* at a predetermined rate.

The present invention exhibits the following effects:

Since the thickness in the diameter direction of the sealant is specified at a value in the range of 0.5 mm to 1.5 mm when considering the durability and sealing performance actually required for a tire tube, the durability and sealing performance, which are incompatible with each other in terms of physical properties, can be made substantially compatible with each other as a matter of practicality.

Since the delivery means for delivering a surface lubricant for preventing adhesive bonding between the peripheral wall and the partition wall for forming the air chamber is provided separately from the delivery means for delivering the surface lubricant so as to prevent adhesive bonding between the peripheral wall and partition wall for forming the sealant chamber, even if a delivery load at one surface lubricant delivery port is large, the delivery pressure applied thereto by the delivery means does not escape from the other surface lubricant delivery port. As a result, a predetermined delivery pressure can be applied to each surface lubricant delivery port, to thereby prevent an extreme decrease or increase in the delivered amount of the surface lubricant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a tire tube comprising the steps of:
    forming a peripheral wall having an approximately circular cross-section;
    forming a partition wall for partitioning an inside of the peripheral wall into an outer peripheral side sealant chamber and an inner peripheral side air chamber;
    determining an ideal thickness of sealant in the sealant chamber by considering the durability and sealing performance of the tire tube at various thicknesses of the sealant, the durability of the tire tube being a runnable distance of 10,000 km or more and the sealing performance being a maximum diameter of a blocked hole of 6 mm or more; and
    filling the sealant chamber with an amount of sealant equal to the determined ideal thickness of the sealant, the ideal thickness of the sealant being a thickness that provides a runnable distance of 10,000 km or more and a maximum diameter of a blocked hole of 6 mm or more.

2. The method of making a tire tube according to claim 1, further comprising the steps of:
    determining the ideal thickness of the sealant in the sealant chamber to be within a range of 0.5 to 1.5 mm; and
    filling the sealant chamber to provide the tire tube with a sealant thickness of 0.5 to 1.5 mm.

3. The method of making a tire tube according to claim 1, further comprising the steps of:
    pumping a first surface lubricant through a first port in an extrusion nozzle and into the outer peripheral side sealant chamber with a first pump; and
    pumping a second surface lubricant through a second port in the extrusion nozzle and into the inner peripheral side air chamber independently of the delivering of the first surface lubricant with a second pump.

4. The method of making a tire tube according to claim 1, wherein said steps of forming a peripheral wall and a partition wall further comprise the steps of extruding the peripheral wall and extruding the partition wall.

5. The method of making a tire tube according to claim 2, wherein said steps of forming a peripheral wall and a partition wall further comprise the steps of extruding the peripheral wall and extruding the partition wall.

6. The method of making a tire tube according to claim 3, wherein the pressure applied by said first pump is different from the pressure applied by said second pump.

7. A method of making a tire tube comprising the steps of:
    extruding a peripheral wall having an approximately circular cross-section;
    extruding a partition wall for partitioning an inside of the peripheral wall into an outer peripheral side sealant chamber and an inner peripheral side air chamber;
    providing a first pump for delivering a first surface lubricant through a first port in an extrusion nozzle and into the outer peripheral side sealant chamber;
    providing a second pump for delivering a second surface lubricant through a second port in an extrusion nozzle and into the inner peripheral side air chamber independently of the delivering of the first surface lubricant;

determining an ideal thickness of sealant in the sealant chamber by considering the durability and sealing performance of the tire tube at various thicknesses of the sealant, the durability of the tire tube being a runnable distance of 10,000 km or more and the sealing performance being a maximum diameter of a blocked hole of 6 mm or more; and filling the sealant chamber with an amount of sealant equal to the determined ideal thickness of the sealant, the ideal thickness of the sealant being a thickness that provides a runnable distance of 10,000 km or more and a maximum diameter of a blocked hole of 6 mm or more.

8. The method of making a tire tube according to claim 7, further comprising the steps of:

determining the ideal thickness of the sealant in the sealant chamber to be within a range of 0.5 to 1.5 mm; and filling the sealant chamber to provide the tire tube with a sealant thickness of 0.5 to 1.5 mm.

9. The method of making a tire tube according to claim 7, wherein the pressure applied by said first pump is different from the pressure applied by said second pump.

10. A method of making a tire tube comprising the steps of:

extruding a peripheral wall having an approximately circular cross-section;

extruding a partition wall for partitioning an inside of the peripheral wall into an outer peripheral side sealant chamber and an inner peripheral side air chamber;

providing a first pump for delivering a first surface lubricant through a first port in an extrusion nozzle and into the outer peripheral side sealant chamber;

providing a second pump for delivering a second surface lubricant through a second port in the extrusion nozzle and into the inner peripheral side air chamber independently of the delivering of the first surface lubricant.

11. The method of making a tire tube according to claim 10, wherein the pressure applied by said first pump is different from the pressure applied by said second pump.

* * * * *